(12) United States Patent
Cho

(10) Patent No.: US 6,541,074 B2
(45) Date of Patent: Apr. 1, 2003

(54) LIQUID PRESSURE TRANSFER PRINTING METHOD FOR STEERING WHEEL RIM OF AUTOMOBILE

(76) Inventor: Youn-soo Cho, 504-201, Hyojachon, 301, Seohyeon-dong, Bundang-gu, Seongnam-city, Kyungki-do (KR)

( * ) Notice: Subject to any disclaimer, the term of this patent is extended or adjusted under 35 U.S.C. 154(b) by 0 days.

(21) Appl. No.: 09/925,029

(22) Filed: Aug. 9, 2001

(65) Prior Publication Data

US 2002/0022090 A1 Feb. 21, 2002

(30) Foreign Application Priority Data

Aug. 11, 2000 (KR) .............................................. 00-46581

(51) Int. Cl.⁷ .............................. B05D 1/18; B05D 5/06; B05D 3/02; B05D 1/36; B05D 3/10
(52) U.S. Cl. .................... 427/430.1; 427/261; 427/262; 427/280; 427/352; 427/385.5; 427/402; 427/407.1; 427/434.3
(58) Field of Search ............................. 427/430.1, 261, 427/262, 280, 402, 407.1, 352, 385.5, 434.3

(56) References Cited

U.S. PATENT DOCUMENTS

| 4,010,057 | A | | 3/1977 | Nakanishi |
| 4,231,829 | A | | 11/1980 | Marui et al. |
| 6,022,438 | A | | 2/2000 | Watanabe et al. |
| 6,065,366 | A | * | 5/2000 | Koyama et al. ............ 156/293 |
| 6,214,154 | B1 | | 4/2001 | Cho |

FOREIGN PATENT DOCUMENTS

| EP | 957021 A2 * | 11/1999 | ........... B29C/65/00 |
| EP | 1 088 676 A1 | 4/2001 | |
| GB | 2 001 908 | 2/1979 | |
| JP | 61-5981 | 1/1989 | |
| JP | 7-117326 A2 | 5/1995 | |

OTHER PUBLICATIONS

U.S. patent application Ser. No. 09/538,900, Cho, filed Oct. 8, 2002.

* cited by examiner

Primary Examiner—Michael Barr
(74) Attorney, Agent, or Firm—Leydig, Voit & Mayer, Ltd.

(57) ABSTRACT

A liquid pressure transfer print method for printing a steering wheel rim of an automobile includes lowering the steering wheel rim up to a boundary line of a primary transfer print portion, without attaching a mask member to the other side surface of the steering wheel rim, opposite to the primary transfer print portion, after floating the transfer print film on liquid, half drying the polyvinyl alcohol layer on the primary transfer print portion of the steering wheel rim for a predetermined time and at a predetermined rate so the polyvinyl alcohol layer at a first transfer print surface is dried to a gel state, flipping the steering wheel rim and lowering the other side surface to beyond the boundary line, and soaking the steering wheel rim having the entire surface transfer printed in a solution and cleaning the polyvinyl alcohol layers by spraying the solution against the surface of the steering wheel rim. Thus, subsequent steps can be omitted, remarkably improving productivity and minimizing waste water generated so that environment pollution can be reduced.

8 Claims, 8 Drawing Sheets

LIQUID PRESSURE TRANSFER PRINTING METHOD FOR STEERING WHEEL RIM OF AUTOMOBILE

BACKGROUND OF THE INVENTION

1. Field of the Invention

The present invention relates to a liquid pressure transfer printing method for a steering wheel rim of an automobile, and more particularly, to a liquid pressure transfer printing method for a steering wheel rim of an automobile in which a mask member used for accurately matching a boundary line and a transfer portion close to the boundary line in divisional transfer printing can be replaced by a polyvinyl alcohol layer of the transfer print film used for transfer printing, when a pattern is printed on the surface of a product formed of plastic, aluminum, steel, or wood and having an uneven 3-D shape, such as the structure of a steering wheel rim of an automobile, using a liquid pressure transfer printing method, so that subsequent steps can be omitted and productivity can be improved.

2. Description of the Related Art

In a typical and well known liquid transfer printing method, as shown in FIG. 1, a transfer printing film 4 floats on liquid 8a contained in a reservoir 8. An object subject to transfer printing, as shown in FIG. 2, is pressed onto the transfer print film 4 from the above, so that a pattern layer 4a of the transfer print film 4 is transferred to the surface of the object by the pressure of the liquid 8a.

The transfer print film 4 includes a polyvinyl alcohol layer 4b (typically called a "PVA film") having a thickness of 25 through 30 μm and the pattern layer 4a is formed by printed ink on one surface of the polyvinyl alcohol layer 4b. The thickness of the polyvinyl alcohol layer 4b is 3 through 5 μm or less and actively dissolves in the liquid 8a.

A steering wheel 2 of an automobile used as the object in the present invention includes a steering wheel rim (not referenced in FIG. 2) having a ring shape and formed of polypropylene, ABS (acrylotrile butadiene styrene copolymer) resin, or rigid expanded urethane, and a boss portion (not referenced in FIG. 2) integrally coupled to the steering wheel rim (including divisional transfer printing portions a and b). The outside of the boss portion is molded by soft urethane, or is coated with leather according to types of products.

In the structure of the above steering wheel rim 2, a liquid pressure transfer printing process is performed to an exposed surface of the steering wheel rim corresponding to a portion other than a portion connected to the boss portion, that is, the divisional transfer printing portions a and b. The surface of the boss portion corresponds to a non-transfer portion 1.

Well-known technologies concerning a method for transfer printing using the transfer print film 4 with respect to the above steering wheel rim are disclosed in Korean Patent Application Nos. 98-17424, 98-17425, 98-36990, 98-36991, and 99-3368 which were filed by the present applicant.

Korean Patent Application No. 98-17424 discloses an invention to solve a problem such as extension and deformation of a print pattern or mismatch in a print state occurring in the conventional liquid pressure transfer print method in which the transfer print film 4 floats on liquid and a steering wheel rim is pressed from above to transfer the print. A selective transfer print is possible with respect to part of a surface or the entire surface b using a mask member 3 (refer to FIG. 3), such as a masking tape or rubber jig. Thus, with respect to the steering wheel rim 2, such as a ball or a circular ring on which transfer printing is difficult, a high quality match is maintained and, simultaneously, a plurality of patterns or shapes can be realized on the object.

FIG. 3 shows steps of liquid pressure transfer print in order according to the invention disclosed in Korean Patent Application No. 98-17424, in which a masking tape and PVA solution are used as a mask member 3 and a protective film 14, respectively.

The transfer print film 4 floats on the liquid 8a. To primarily perform transfer printing on a divisional transfer print portion b at the lower side, the mask member 3 is attached to an upper divisional transfer print portion a (in the first step). The steering wheel rim is lowered so that a transfer print surface 5 is formed (in the second step). Here, the pattern layer 4a reacts with a solvent on the steering wheel rim and completely adheres to the rim surface. Since the polyvinyl alcohol layer 4b remains, the remaining polyvinyl alcohol layer is washed and removed, and then dried. Next, PVA solution is applied to the dried transfer surface 5 to form the protective film 14 (in the third step) and the protective film 14 is dried. The mark member 3 covering the upper divisional transfer print portion a is removed (in the fourth step) so that a second transfer print surface 5a that is clean and to which transfer printing has not yet been performed is exposed. The second transfer print 5a is flipped to face downward and liquid pressure transfer printing is performed in the same manner as in the first transfer printing (in the fifth step). Here, the pattern layer 4a is partially transfer printed to the surface of the protective film 14 over a boundary 6 of the protective film 14. Since the protective film 14 is soluble, the protective film 14 is removed together with an overlapped transfer print portion during the subsequent cleaning step. Thus, a finished product having the transfer print surface 5 in which the transfer-printed patterns are matched at the boundary line 6, can be obtained (in the sixth step).

However, in the liquid pressure transfer printing method, when an end portion of the boundary of the mask member 3 makes an angle of 60° or less with respect to the steering wheel rim, as shown in FIG. 4, the first and second transfer print films 4 closely adhere to the surface of the steering wheel rim so that no air bubble is interposed therebetween (refer to FIG. 5) during the first and second transfer prints and the transfer-printed patterns are matched and naturally connected at the boundary. Thus, a highly precise step of cutting the thin mask member 3 at an angle of 60° or less is needed. Also, when the mask member 3 covering the divisional transfer print portion a is removed in the state in which the protective film 14 is applied to the first transfer print surface 5 and dried, the boundary portion of the protective film 14 partially overlapped on the surface of the mask member 3 may be irregularly removed, thus-causing mismatching of patterns.

The invention disclosed in Korean Patent Application No. 99-3368 concerns faster and accurate matching of patterns by reducing the difficulty in working the abovedescribed invention in which precision is required with respect to matching of the print pattern at a boundary portion of the mask member. This invention suggests a solution to problems of maintaining the inclined angle of the end portion of the mask portion at 60° and accurately attaching the mask member after continuous transfer prints to maintain a distance of 0.1–0.2 mm from the center line.

However, the above liquid pressure transfer print methods, in which two cleaning steps and the protective film of a PVA solution are used, generate a large amount of waste water, which causes another problem of contaminating the environment.

Korean Patent Application Nos. 98-17425, 98-36990, and 98-36991 disclose a variety of inventions enabling mass production by adopting the liquid pressure transfer print method suggested by the invention of Korean Patent Application No. 98-17424.

The above liquid pressure transfer print methods include a sequence of steps using a mask member which is similar to the above-described steps, but different in that a masking tape (mask member) is used instead of using PVA solution as a protective film of the first transfer print surface. Thus, since a mask member that is not dissolved in solution is used in masking the first transfer print surface, accurate matching of a boundary line with the mask member attached to the second transfer print surface is needed. To perform such work consumes much time and reduces productivity.

SUMMARY OF THE INVENTION

To solve the above-described problems, it is an object of the present invention to provide a liquid pressure transfer printing method for a steering wheel rim of an automobile in which a mask member used for accurate match of a boundary line and transfer print portions adjacent thereto is replaced by a polyvinyl alcohol layer of a transfer print film used for transfer print in the step of divisional transfer print when a predetermined pattern layer is to be transfer printed b using a liquid pressure transfer print method using a transfer print film onto a surface of a product having a very uneven 3-D shape, so that a plurality of subsequent steps can be omitted, thus remarkably improving productivity, one time cleaning step minimizes the amount of waste water generated so that environment pollution can be reduced.

To achieve the above object, there is provided a liquid pressure transfer print method for a steering wheel rim of an automobile by which a predetermined pattern is transfer printed on one side surface of the steering wheel rim divided into two side surfaces in a lengthwise direction by using a transfer film in which a pattern layer is formed on a polyvinyl alcohol layer. The method comprises lowering the steering wheel rim for a predetermined time, to a boundary line of a primary transfer print portion, without attaching an additional mask member to the other side surface of the steering wheel rim opposite to the primary transfer print portion, after floating the transfer print film on liquid (a first transfer print step). Half drying the polyvinyl alcohol layer coating the primary transfer print portion of the steering wheel rim in the first transfer print step, for a predetermined time and at a predetermined rate (a half drying step). When the polyvinyl alcohol layer at the outer side of a first transfer print surface in the half drying step is dried to a gel state, flipping the steering wheel rim and lowering the other side surface to be transfer printed over the boundary line for a predetermined time (a second transfer print step), and soaking the steering wheel rim having the entire surface thereof completely transfer printed in solution for a predetermined time and cleaning the outside polyvinyl alcohol layers of the first and second transfer print surfaces by injecting the solution against the surface of the steering wheel rim for a predetermined time (an entire surface cleaning step)

It is preferred in the present invention that the steering wheel rim is dipped to be inclined at a predetermined dipping angle so that air bubbles are prevented from entering between the pattern layer of the transfer print film and the steering wheel rim during the first and second transfer print steps and the steering wheel rim is continuously dipped in a horizontal state, and that the dipping angle of the steering wheel rim is maintained between 1–5°.

It is preferred in the present invention that the time for transfer print in the first and second transfer print steps is 7–14 seconds.

It is preferred in the present invention that the half drying step is performed by having the transfer surface face downward, and that, in the half drying step, the polyvinyl alcohol layer is naturally dried by being exposed to the air at the normal temperature for 30–90 minutes.

It is preferred in the present invention that, in the half drying step, the polyvinyl alcohol layer is forcedly dried by being heated at a temperature between 60–90° C. in a closed space.

It is preferred in the present invention that, in the half drying step, the drying rate of the polyvinyl alcohol layer is maintained between 60–70%.

It is preferred in the present invention that, in the entire surface cleaning step, the steering wheel rim is dipped in the solution at a temperature of 30° C. for 50–90 seconds and a solution injection apparatus injects the solution for 10–12 minutes to completely removed the polyvinyl alcohol layer remaining after a dipping process.

BRIEF DESCRIPTION OF THE DRAWINGS

The above object and advantages of the present invention will become more apparent by describing in detail preferred embodiments thereof with reference to the attached drawings in which:

FIG. 6A shows a first transfer print in which the steering wheel rim is lowered onto a surface of a transfer print film at a dipping angle;

FIG. 6B shows the first transfer print in which the steering wheel rim is gradually lowered to be horizontal so that the first transfer print is completed;

FIG. 6C shows a second transfer print in which, after half drying the steering wheel rim, the steering wheel rim is flipped and lowered onto a surface of a transfer print film at a dipping angle to transfer print part of the opposite side;

FIG. 6D shows the second transfer print in which the steering wheel rim is gradually lowered to be horizontal so that the second transfer print is completed;

FIG. 6E shows the second transfer print in which the steering wheel rim is lowered onto a surface of a transfer print film at a dipping angle to transfer print the remaining part of the flipped steering wheel rim;

FIG. 6F shows the second transfer print in which the steering wheel rim is gradually lowered to be horizontal so that the second transfer print is completed;

FIG. 6G shows soaking the steering wheel rim having the surfaces to which transfer print has been completely applied in water in a reservoir for a predetermined time;

DETAILED DESCRIPTION OF THE INVENTION

Figure 1:
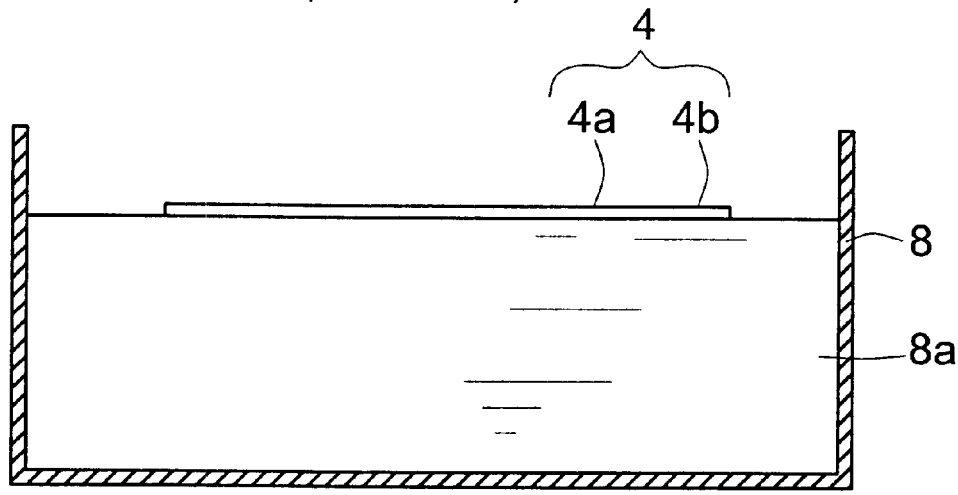
FIG. 1 is a view showing a state of the transfer print film floating on liquid used in a typical liquid pressure method.
Figure 2:
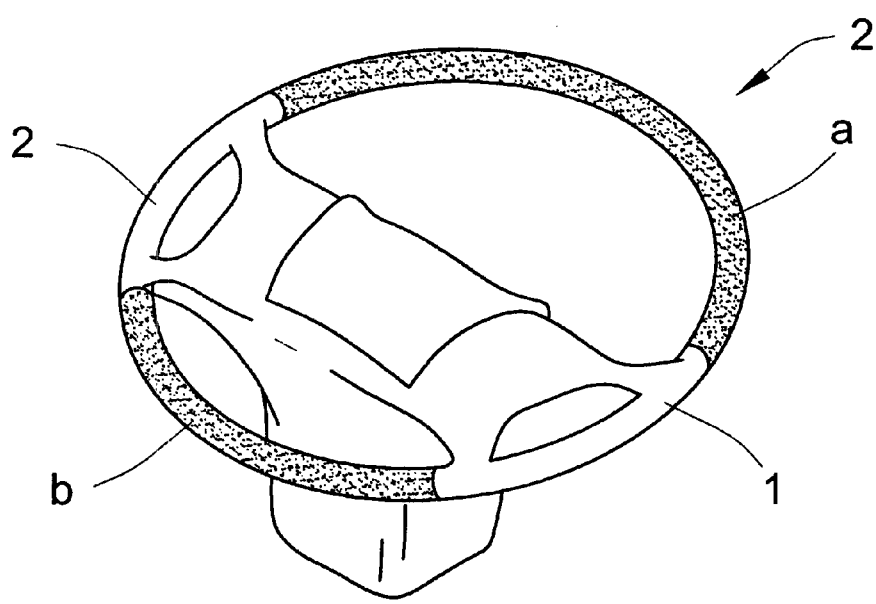
FIG. 2 is a perspective view showing a typical steering wheel for an automobile.

Referring to FIGS. 6A through 8 and FIGS. 1 and 2, in a liquid pressure transfer print method according to the present invention, an object having an uneven shape such as the steering wheel rim 2 is divided into halves in the lengthwise direction of the object subject to transfer printing in consideration of convenience in work and a plurality of divisional transfer prints are performed by flipping the steering wheel rim. Fundamentally, the steering wheel rim is lowered onto the transfer print film 4 floating on the liquid 8a of the reservoir 8 and the pattern layer 4a is transfer printed by means of liquid pressure. In particular, the present invention suggests a liquid pressure transfer print method not using an additional mask member at all.

That is, in the present invention, the surface of the steering wheel rim is divided into up and down sides and a plurality of liquid pressure transfer pressure processes are performed on the transfer print film 4 where the pattern layer 4a is formed on the polyvinyl alcohol layer 4b. In transfer printing a predetermined polyvinyl alcohol layer 4a on the surface of the steering wheel rim, the first transfer print step for performing transfer print on one side surface of the steering wheel rim, a half-drying step for drying the coated polyvinyl alcohol layer 4b into a gel state, the second transfer print step for performing transfer print on the other side surface of the steering wheel rim by flipping the steering wheel rim, and an entire surface cleaning step for cleaning the polyvinyl alcohol layer 4b coated on the entire surface of the steering wheel rim, are sequentially performed.

Figure 6A:
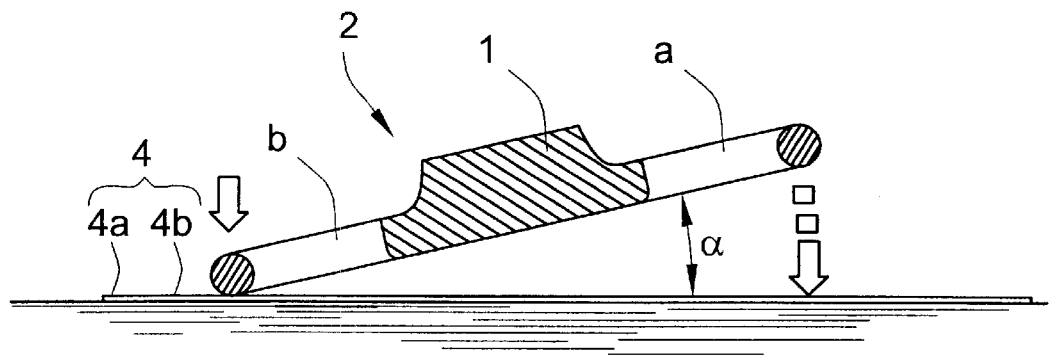
FIGS. 6A through 6G are views sequentially showing steps of a liquid pressure transfer print method for a steering wheel rim of an automobile according to the present invention.
Figure 6B:
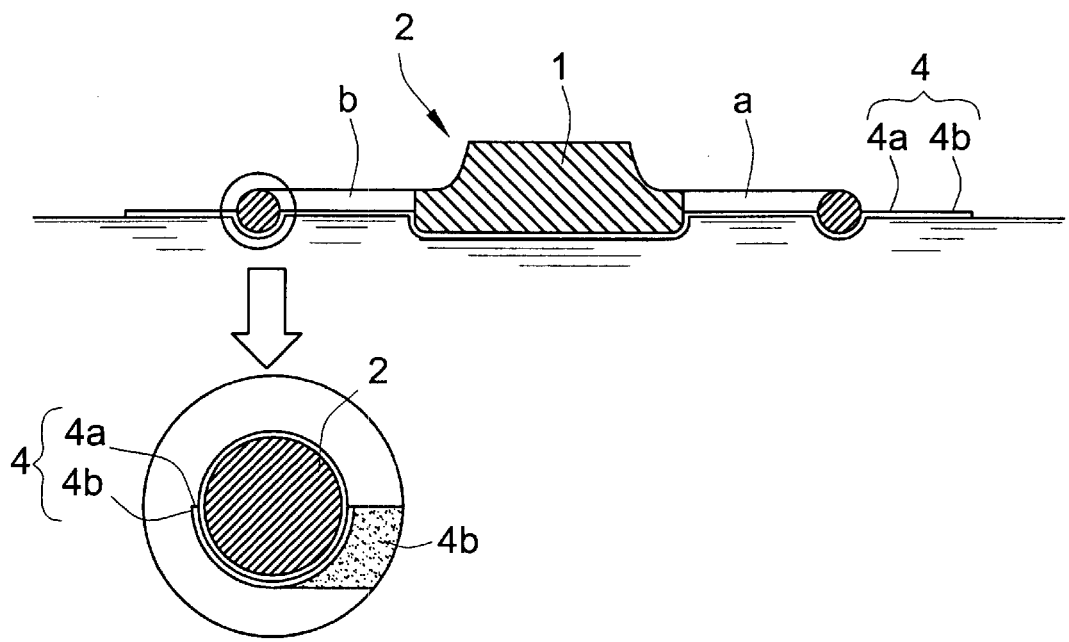
Figure 6C:
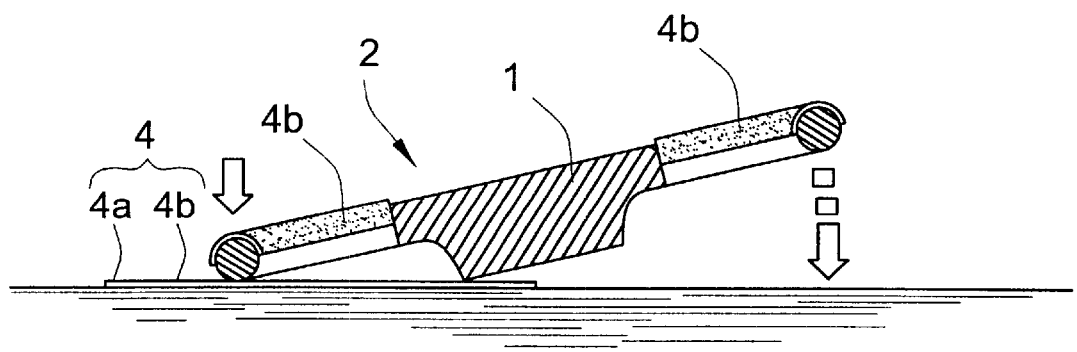
Figure 6D:
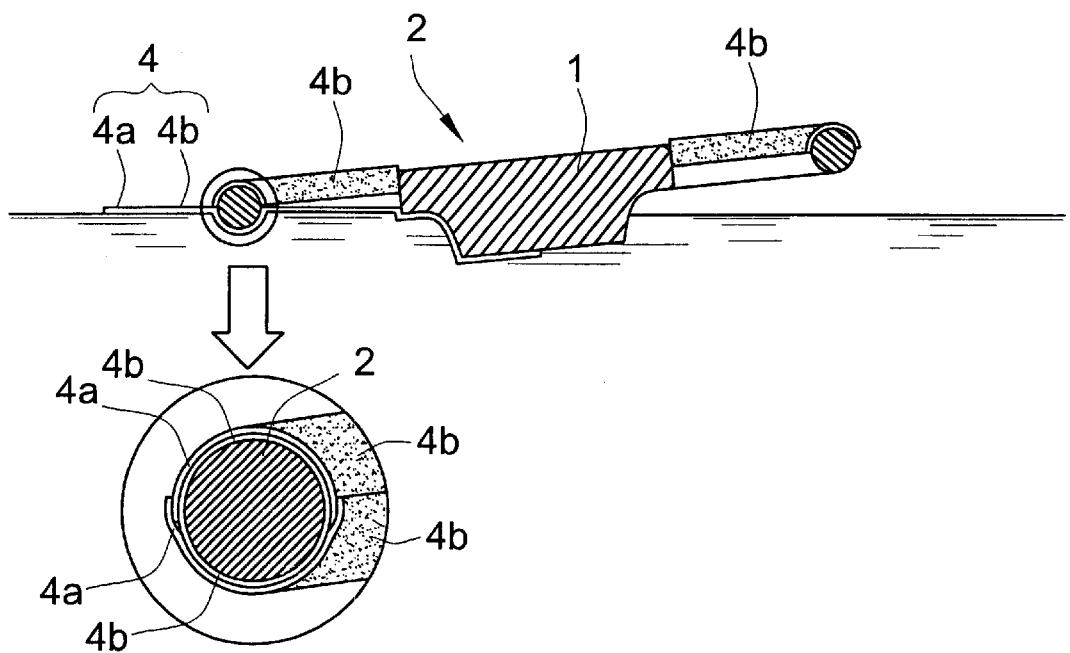
Figure 6E:
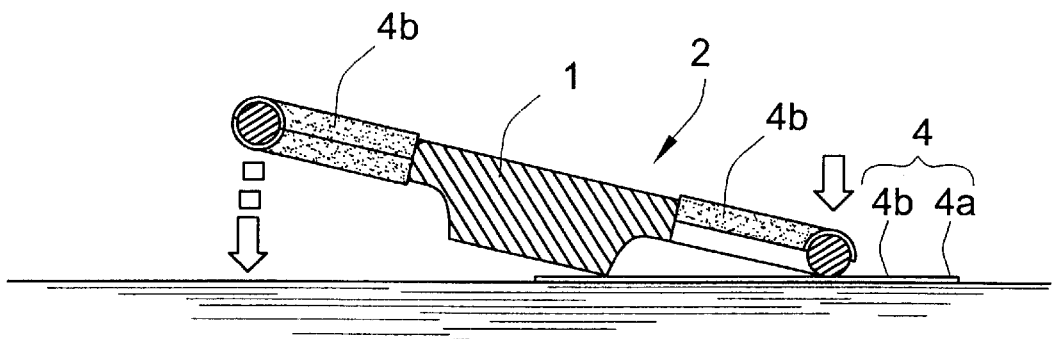
Figure 6F:
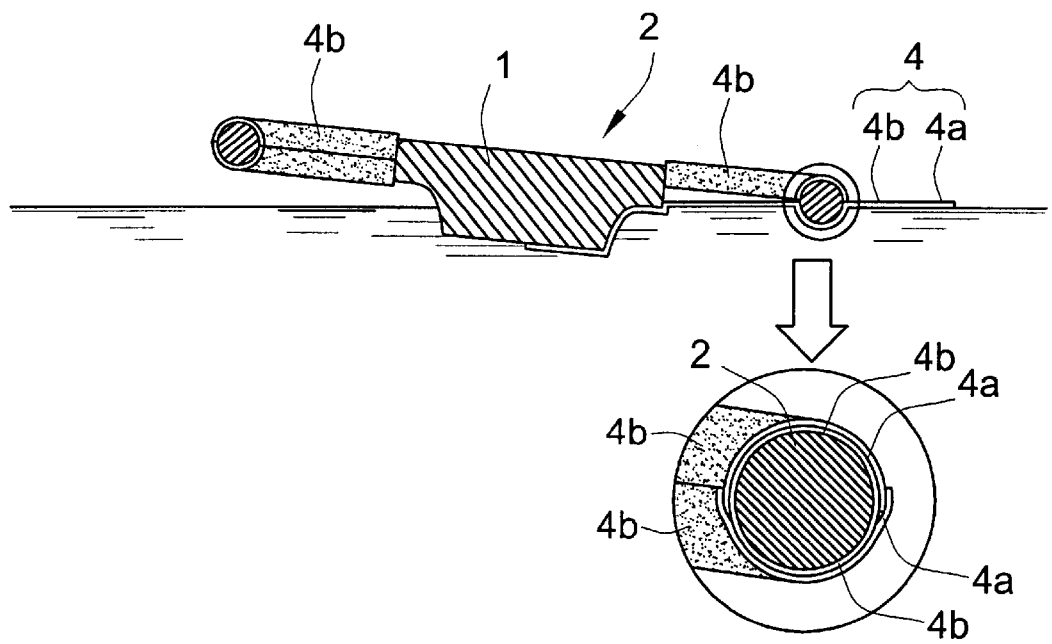

In detail, in the first transfer print step, as shown in FIGS. 6A and 6B, the steering wheel rim is stably lowered up to a boundary line of a primary transfer print portion within a predetermined time while no additional mask member is attached to the side of the steering wheel rim in the lengthwise direction opposite to the primary transfer print portion. In the first transfer print step, the steering wheel rim must be accurately lowered so that the pattern layer 4a is transfer printed to accurately match the boundary line.

Here, the stable lowering of the steering wheel rim means the continuous dipping of the steering wheel rim in a horizontal state after the steering wheel rim starts to dip to be inclined at a predetermined dipping angle α, so that air bubbles do not enter between the steering wheel rim and the pattern layer 4a of the transfer print film 4 during a transfer print process. Preferably, the dipping angle α of the steering wheel rim is maintained between 1–5°, in particular, 2–3°.

Figure 8:
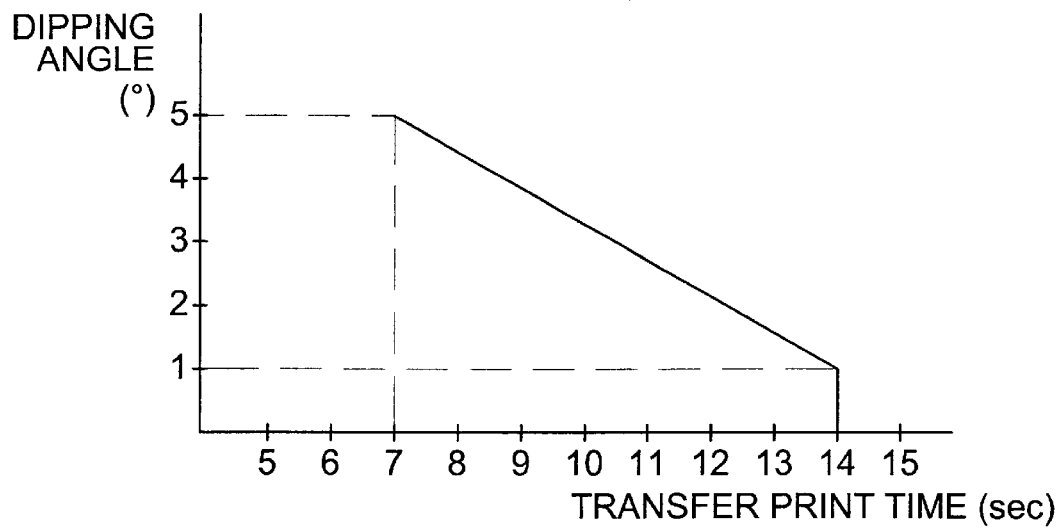
FIG. 8 is a graph showing the relationship between the dipping angle and transfer print time during the first or second transfer print.

The above results from experiments and, as shown in the graph of FIG. 8, as the dipping angle α increases within the above range of angles, air bubbles can be easily exhausted so that the time for transfer print including dipping proceeding time can be set to be short. As the dipping angle α is so small as to be close to 0°, since time for exhausting air bubbles is needed, the time for transfer print is set to be by rather long. The time for transfer print in the transfer print step is set to be within a range of 7 seconds when the dipping angle α is 5° and 14 seconds when the dipping angle α is 1°.

Figure 7:
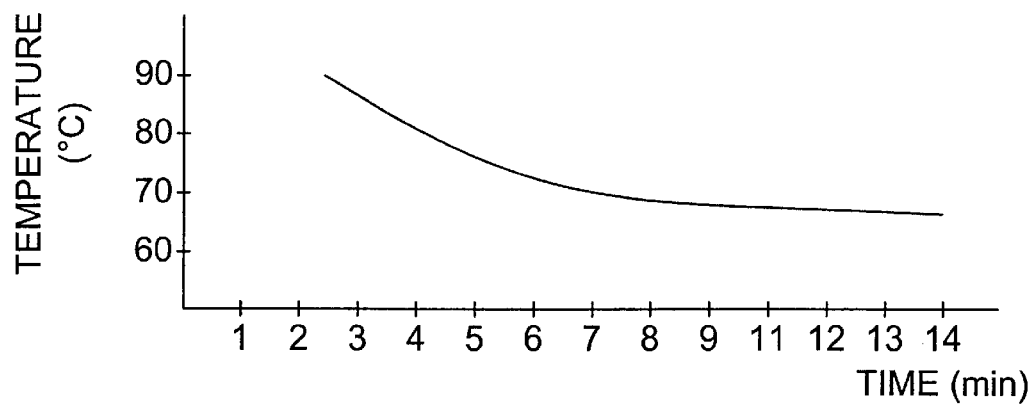
FIG. 7 is a graph showing the relationship between a temperature for heating and time taken during forced drying at an appropriate drying rate by heating the polyvinyl alcohol layer of the first transfer print surface inside a closed space.

Next, the step of half drying is performed, in which the polyvinyl alcohol layer 4b coated on one side of the steering wheel rim in the lengthwise direction of the steering wheel rim in the first transfer print step is dried for a predetermined time at a predetermined rate. In the half drying step, the polyvinyl alcohol layer 4b is naturally dried by being exposed for 30–90 minutes at the normal temperature in the air, or is forcedly dried by being heated at 60–90° within a closed spaced to reduce the time for drying. During the half drying step, the dying rate of the polyvinyl alcohol layer 4b is preferably between 60–70%. FIG. 7 shows the time of lapse according to a heating temperature during the forced drying step based on the results obtained from experiments. To maintain the above drying rate, 3–13 minutes are needed for the drying time within the above typical hearing temperature range.

Figure 3:
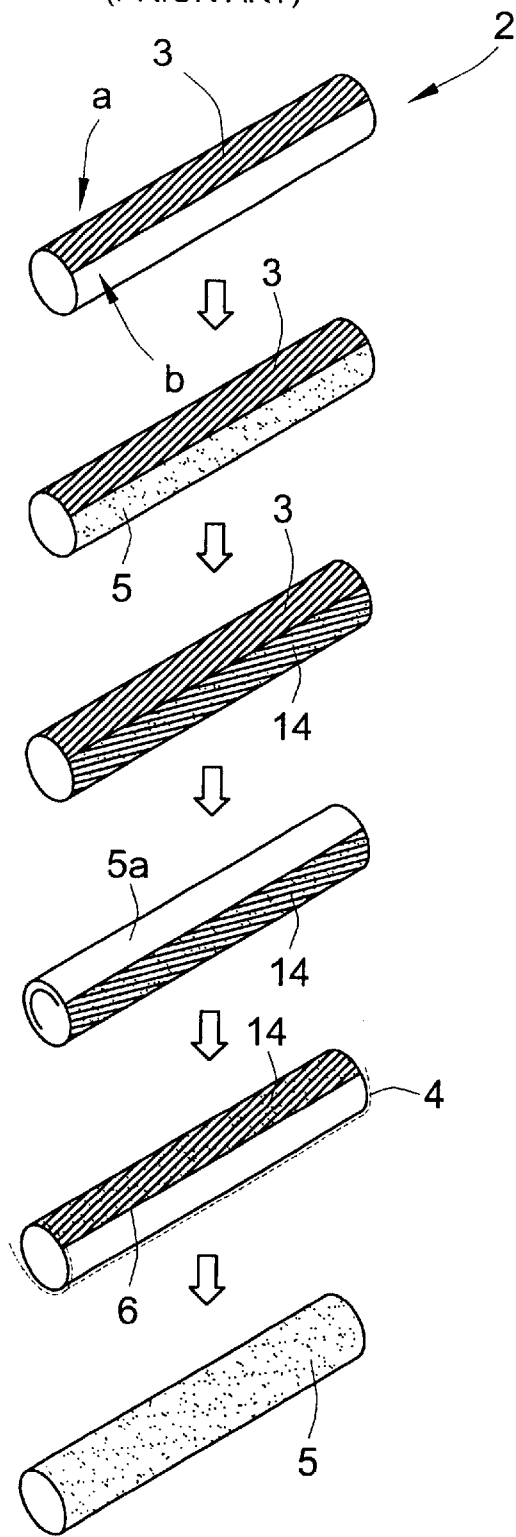
FIG. 3 is a view showing a sequence of steps in a liquid pressure transfer print method according to the conventional masking method
Figure 4:
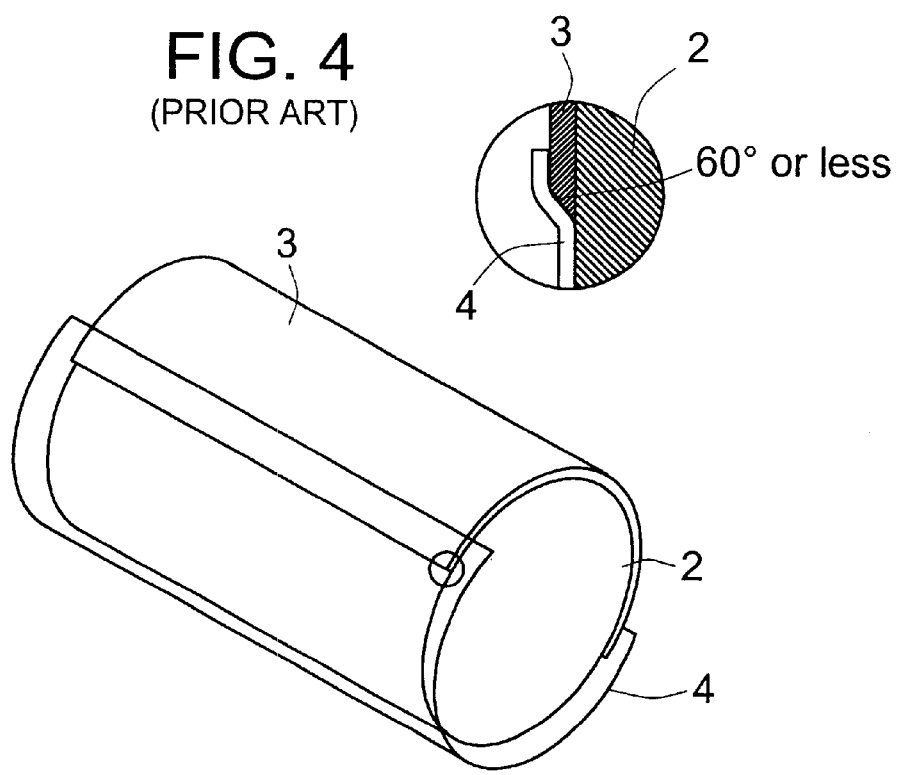
FIG. 4 is a view showing a combined portion of the mask member in the earlier invention proposed by the present inventor considering a degree of match of a boundary line during divisional transfer print according to the conventional technology.
Figure 5:
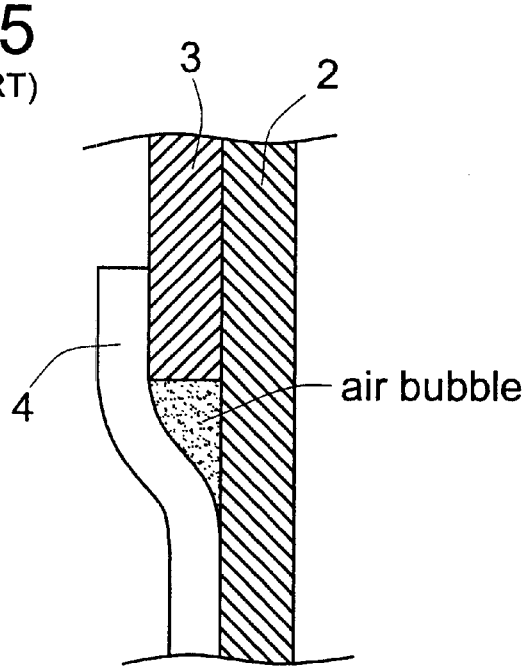
FIG. 5 is a view showing a combined portion of the conventional mask member comparing to the combined portion of FIG. 4.

During the half drying step, the transfer print surface 5 (refer to FIG. 3) where the polyvinyl alcohol layer 4b is coated must face downward. If the drying is performed while the transfer print surface 5 is maintained to face upward, PVA solution flows toward the boundary portion to partially cover the second transfer print surface 5a (refer to FIG. 3), which may cause mismatch of patterns at the boundary portion during the second transfer print.

In the second transfer print step, as shown in FIGS. 6C through 6F, when the polyvinyl alcohol layer 4b of the transfer print surface 5 is dried into a gel state, after flipping the steering wheel, the remaining portion to be transfer printed is stably lowered within a predetermined time over the boundary line. When the second transfer print step is completed by a single step, since the transfer print film 4 may be deformed by being pressed by an uneven shape of the non transfer print portion 1, it is preferred to divide the second transfer print surfaces into two areas and repeatedly perform the same step on each of the divided areas. Of course, the second transfer print step is performed in the same manner as the first transfer print step, that is, the steering wheel rim is lowered at a predetermined dipping angle α.

When a pattern is transfer printed on the entire surface of the steering wheel rim, part of pattern layer 4a in the second transfer print step closely adheres to the polyvinyl alcohol layer 4b previously coated at around the boundary line and the polyvinyl alcohol layer 4b is coated thereon.

Figure 6G:
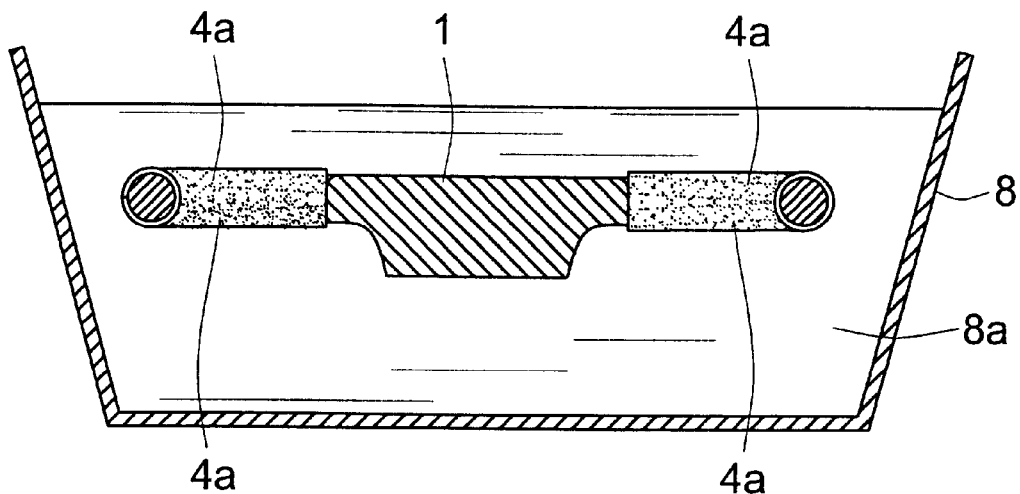
Figure 6H:
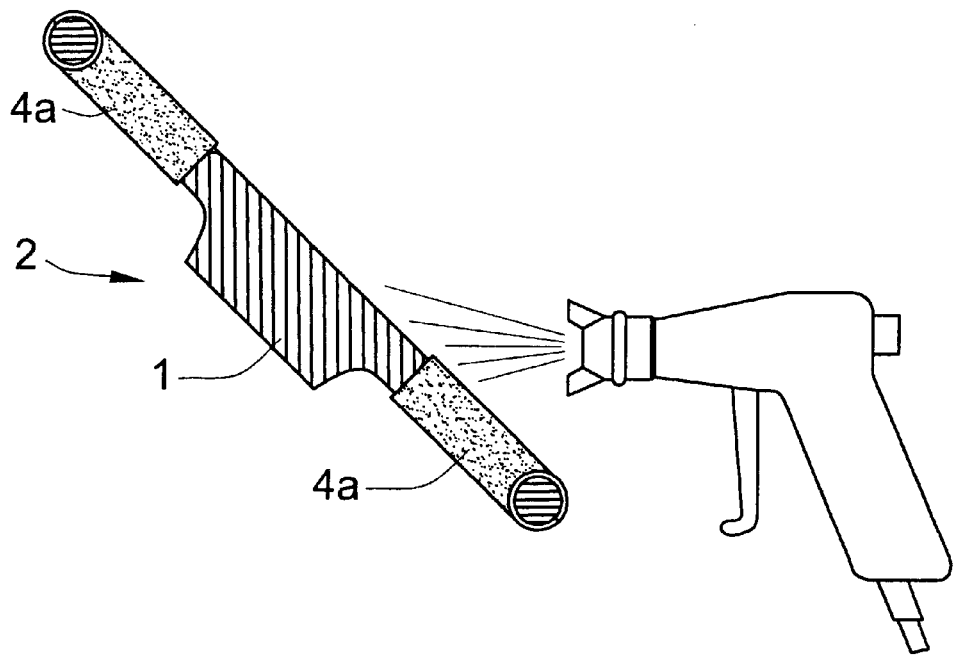
FIG. 6H shows cleaning the polyvinyl alcohol layer covering the outer side of the transfer print surface by injecting solution against the surface of the steering wheel rim for a predetermined time.

As the final step in the present invention, as shown in FIGS. 6G through 6H, an entire surface cleaning step in which the steering wheel rim having completed transfer print to the entire surface thereof is soaked in the liquid 8a for a predetermined time and the liquid is injected to the surface of the steering wheel rim for a predetermined time to clean the polyvinyl alcohol layer 4b is performed. The cleaning step intends to remove the polyvinyl alcohol layer 4b coated on the surface of the steering wheel rim. Since the polyvinyl alcohol layer 4b is soluble, even the polyvinyl alcohol layer 4b coated in the first transfer print step on the inner side of the overlapped portion at the boundary line is dissolved together with the polyvinyl alcohol layer 4b coated in the second transfer print step on the outer side of the overlapped portion. Thus, the patterns at the boundary line can be completely matched.

The entire surface cleaning step is performed at the liquid temperature of 30° C. for 50–90 seconds. In the entire surface cleaning step, an injection cleaning step in which solution is injected by an additional solution injecting apparatus for 10–12 minutes is performed so that the polyvinyl alcohol layer 4b remaining after the soaking in the liquid 8a and cleaning are performed can be completely removed.

In the present invention, a complicated mask member attaching step is not necessary so that such a step can be omitted, thus enabling automation of production. Compared to the conventional steps needing a total of 24 hours, the present.invention only requires 4–5 hours for completing every steps so that actual process time can be reduced by ⅕ or more.

Although the liquid pressure transfer print method according to the present invention is described with respect to a steering wheel rim, it can be applied to any object having a curved 3 dimensional shape or a concave groove which may cause extension of a pattern during the liquid transfer printing process. For example, a series of steps can be performed by the liquid transfer printing method according to the present invention by being clamped using a jig, with respect to a shift knob of a shift lever (a gear change lever) of an automatic or manual type to operate a transmission. Thus, an object subject to the present method is not limited to a steering wheel rim.

As described above, in the liquid pressure transfer print method according to the present invention, in the step of performing divisional transfer print with respect to the steering wheel rim, since a mask member used for accurately matching the boundary line with the adjacent transfer print portion can be replaced by the polyvinyl alcohol layer of the transfer print film used for transfer print, a plurality of the subsequent steps can be omitted so that productivity can be remarkably improved and accordingly, cost ad time for work can be reduced. Also, since the cleaning step is performed only one time, the amount of generation of waste water is minimized so that environmental pollution is reduced. Also, automation in production is made easy, mass production is facilitated.

What is claimed is:

1. A liquid pressure transfer print method for transferring a printed pattern to a steering wheel rim divided into two side surfaces in a lengthwise direction, using a transfer film having a pattern layer disposed on a polyvinyl alcohol layer, the method comprising:

floating a first polyvinyl alcohol transfer print film on a liquid;

without attaching a mask member to the steering wheel rim on a second of the two side surfaces, opposite a first of the two side surfaces, the first of the side surfaces being a primary transfer print portion, lowering the steering wheel rim into the liquid on the transfer print film for a first time period, to a boundary line of the primary transfer print portion, and transferring a polyvinyl alcohol layer onto the primary transfer print portion;

drying the polyvinyl alcohol layer coating on the primary transfer print portion of the steering wheel rim for a second time period and at a drying amount;

floating a second polyvinyl alcohol layer on the liquid;

when the polyvinyl alcohol layer on the primary transfer print portion has dried to a gel state, flipping the steering wheel rim and lowering the second side surface to beyond the boundary line, for a third time period, onto the second polyvinyl alcohol layer floated on the liquid;

removing the steering wheel rim from the liquid; and soaking the steering wheel rim in a solution and cleaning the polyvinyl alcohol layers on the first and second transfer print surfaces by spraying the solution against the steering wheel rim.

2. The method as claimed in claim 1, including introducing the steering wheel rim at a dipping angle into the liquid so that air bubbles are prevented from entering between the transfer print film and the steering wheel rim during transfer printing and continuously maintaining the steering wheel rim in a horizontal state in the liquid.

3. The method as claimed in claim 2, wherein the dipping angle of the steering wheel rim is between 1–5°.

4. The method as claimed in claim 1, wherein the first and third time periods are 7–14 seconds.

5. The method as claimed in claim 1, wherein, in the drying, orienting the transfer surface with the polyvinyl alcohol layer facing downward to prevent flow of the polyvinyl alcohol solution across the boundary line toward the second side surface.

6. The method as claimed in claim 1, wherein, in the drying, drying the polyvinyl alcohol layer by exposure to air at room temperature for 30–90 minutes.

7. The method as claimed in claim 1, wherein, in the drying, heating the polyvinyl alcohol layer to a temperature between 60–90° C.

8. The method as claimed in claim 1, wherein, in the cleaning dipping the steering wheel rim in the solution at a temperature of 30° C. for 50–90 seconds and spraying the solution for 10–12 minutes to completely remove remaining polyvinyl alcohol.

* * * * *